United States Patent Office 3,584,048
Patented June 8, 1971

3,584,048
BIS(AZOMETHINE) COMPOUNDS AND PROCESS
Paul H. Ogden, Oakdale Township, Washington County, Minn., assignor to Minnesota Mining and Manufacturing Company, St. Paul, Minn.
No Drawing. Filed July 5, 1966, Ser. No. 562,540
Int. Cl. C07c *119/00*
U.S. Cl. 260—566                9 Claims

ABSTRACT OF THE DISCLOSURE

Process for producing fluorinated α,ω-bis(azomethino) alkylenes in which a fluorodiazirine or mixture of fluorodiazirine and fluorinated olefin or perfluoro-2,3-diaza-1,3-butadiene and fluorinated olefin maintained at a temperature in the range of −140° to 100° C. is subjected to ultraviolet photolysis to form new bis(azomethine) compounds having a terminal functional group on each end of the compound. Because of their difunctional character, the compounds are useful as chemical intermediates in the formation of compounds such as diamides, diesters, dinitriles, diacids and diisocyanates, which may be used as crosslinking and chain-terminating agents in polymerization.

---

This invention relates to perfluorocarbons and more particularly to a new class of compounds containing perfluoroazomethine groups and to processes for their preparation.

The compounds of the invention are believed to be a previously unknown class of substances containing substantially only carbon, nitrogen and fluorine; however, some chlorine or bromine atoms may be present at sites otherwise occupied by fluorine. The nitrogen atoms are present as part of fluorinated azomethine groups. They can be characterized generally by the descriptive name fluorinated α,ω-bis(azomethino)alkylenes. They can also be named as diaza-alkylene-dienes, and this terminology is particularly convenient for the compounds of lower molecular weight.

The readily available compounds of the invention can be conveniently represented by the general formulae $$CF_2=N-(CFR)_n-N=CF_2$$

and $$CF_2=N-(CF_2CFR)_m-N=CF_2$$

wherein R represents fluorine, chlorine, bromine or a lower perfluoroalkyl group; $n$ is an integer from 1 to 20 when R is fluorine, and 1 or 2 when R is chlorine, bromine or a lower perfluoroalkyl group; and $m$ is an integer from 1 to 20 when R is fluorine or chlorine, and 1 or 2 when R is bromine or a lower perfluoroalkyl group. Lower perfluoroalkyl groups contain 1 to 5 carbon atoms.

The compounds of the invention are useful chemical intermediates. The reactive fluoroazomethine groups react with nucleophiles, such as water, amines and alcohols to produce diisocyanates, diamides and diesters. Furthermore, dinitriles and diacids can be prepared from these by known techniques. They can be used as crosslinking and chain-terminating agents, e.g. for hydroxyl group-terminated polymers. The fluorinated diacids produced from these intermediates are useful for their acidic properties in fluorocarbon solvents, as well as for comonomers in the production of fluorinated or partially fluorinated polyesters.

The fluorinated bis(azomethino)alkylenes of the invention can be prepared by several methods, as follows:

(1) By ultraviolet photolysis of difluorodiazirine, at temperatures in the range of −140° to −78° C. The reaction follows the simplified equation

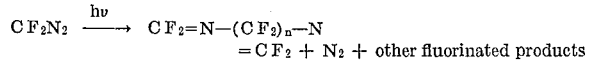

wherein $n$ is 1 to 10.

(2) By ultraviolet photolysis, at low temperatures, of a mixture of difluorodiazirine and a fluorinated olefin exemplified as follows:

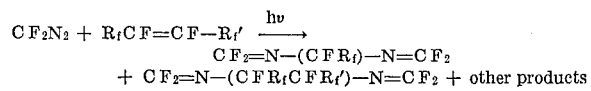

(wherein $R_f$ and $R_f'$ are fluorine, chlorine, bromine or a lower perfluoroalkyl, chloro-fluoroalkyl or bromo-fluoroalkyl radical).

(3) By ultraviolet photolysis of a mixture of perfluoro-2,3-diaza-1,3-butadiene and a fluorinated olefin, e.g. (equation not balanced)

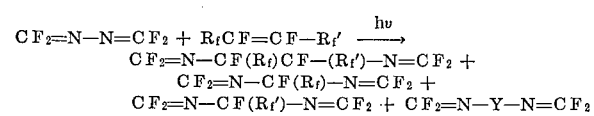

(wherein $R_f$ and $R_f'$ are as above and Y is a fluoroalkylene chain resulting from rearrangement of $R_fCF$: or $R_f'$ CF: moieties).

Illustrative olefins which are useful in these processes are tetrafluoroethylene, chlorotrifluoroethylene, bromotrifluoroethylene, hexafluoropropylene and perfluorobutene-2. Preferably fluorinated olefins having from 2 to 8 carbon atoms are employed.

Equations 2 and 3 above are believed to represent reasonable theoretical explanations of the observed results. However, applicant is not to be bound by this theory with respect to the mechanisms involved.

Perfluoro 2,3-diaza-1,3-butadiene is prepared by pyrolysis of difluorodiazirine, according to the method of R. Mitsch, J. Heterocyclic Chemistry, vol. 1, page 59, 1964.

In all of these processes, ultraviolet light of wavelength 1800 to 4000 A. is used. The time required to effect reaction to form reasonable yields of desired product depends to an extent on the energy obtainable from the ultraviolet source, as well as the quantity of material to be photolyzed, the reactivity of the olefins and the reaction temperature.

The temperatures used in the reaction range from −140° to 100° C. Preferably, a temperature in the range of about −78° to 25° C. is used.

Since the photolysis of $CF_2=N-N=CF_2$, which absorbs light of wavelength 1700–2200 A. is an essential step in the formation of the product, the use of silica or quartz vessels which transmit light of this wavelength is found to improve the yields of the desired products.

Use of an excess of difluorodiazirine or perfluoro-2, 3-diaza-1,3-butadiene over that of the olefin appears to favor lower molecular weights in the final products, i.e. $n$ or $m$ in the general formula above is smaller.

The use of easily polymerized olefins, such as tetrafluoroethylene or chlorotrifluoroethylene, results in higher molecular weights in the products, and products in which $n$ or $m$ approaches or reaches 20 are easily formed. In some cases the mixtures of high molecular weight products are difficult to separate.

The compounds of the invention range from colorless volatile liquids to white solids, depending on their molecular weights. They all have maxima in their infrared absorption spectra at 1700–1800 cm.$^{-1}$, characteristic of the $F_2C=N-$ group. They are isolated from the reaction mixtures in which they are formed by conventional methods such as gas-liquid chromatography, fractional distillation-condensation and fractional-distillation.

The new fluorinated bis(azomethino)alkylenes are readily hydrolyzed and adventitious water must be rigorously excluded from reaction, separation and storage vessels.

The following non-limiting examples, in which all parts are by weight unless otherwise specified, will more particularly illustrate the products of the invention and the processes for their preparation.

EXAMPLE 1

Difluorodiazirine, $CF_2N_2$ (0.5 g., 6.4 millimoles), was condensed under vacuum into a silica tube at $-196°$ C. which was then sealed and maintained at $-127°$ C. in an n-propyl alcohol-liquid nitrogen slush bath which was prepared in a silica Dewar flask. The liquid material was then photolyzed for four hours with ultraviolet light from a BH-6 lamp (an electric lamp producing strong ultraviolet light in the region of 1800–1400 A., and available from the General Electric Co.). The products were then separated by fractional distillation-condensation, followed by gas-liquid chromatography using a Kel-F (poly(trifluorochloro)ethylene) tetramer column.

The fraction condensed at $-95°$ C. was found to contain perfluoro-2,4-diaza-1,4-pentadiene, $$CF_2=N-CF_2-N=CF_2$$

(0.03 millimole), and perfluoro-2,5-diaza-1,5-hexadiene, $CF_2=N-CF_2-CF_2-N=CF_2$ (0.05 millimole), which were identified by their infrared, mass and $F^{19}$ n.m.r. spectra, together with elemental analysis.

*Analysis.*—Calc'd for $C_3F_6N_2$ (percent): F, 63.0. Found (percent): F, 63.4. Calc'd for $C_4F_8N_2$ (percent): F, 66.5. Found (percent): F, 67.5.

EXAMPLE 2

Perfluoro-2,3-diaza-1,3-butadiene, $CF_2=N-N=CF_2$ (0.57 g., 4.5 millimoles), and difluorodiazirine, $CF_2N_2$ (0.67 g., 8.6 millimoles), were condensed under vacuum into a silica tube cooled to $-196°$ C. The mixture was then warmed to room temperature and photolyzed for four hours using a BH-6 lamp.

From the reaction mixture, perfluoro-2,4-diaza-1,4-pentadiene, $CF_2=N-CF_2-N=CF_2$ (0.1 g., 0.56 millimole, 12.5%), perfluoro-2,5-diaza-1,5-hexadiene, $$CF_2=N-CF_2-CF_2-N=CF_2$$

(0.26 g., 1.14 millimoles, 25%), perfluoro-2,6-diaza-1,6-heptadiene, $CF_2=N-CF_2-CF_2-CF_2-N=CF_2$ (0.034 g., 0.012 millimole, 2.5%), and perfluoro-2,7-diaza-1,7-octadiene, $CF_2=N(CF_2)_4-N=CF_2$ (0.017 g., 0.005 millimole, 1.25%), were isolated by fractional distillation-condensation followed by gas-liquid chromatography, and characterized by their infrared and mass spectra, together with molecular weights.

Some higher molecular weight material was also obtained.

EXAMPLE 3

Perfluoro-2,3-diaza-1,3-butadiene, $CF_2=N-N=CF_2$ (0.15 g., 1.17 millimoles), and tetrafluoroethylene, $$CF_2=CF_2$$

(0.056 g., 0.56 millimole), were condensed into a silica tube under vacuum at $-196°$ C., and then photolyzed together at room temperature for 80 hours using a Hanovia 140-watt ultraviolet lamp. Perfluoro-2,3-diaza-1,3-butadiene (0.018 g., 0.14 millimole, 12%), perfluoro-2,4-diaza-1,4-pentadiene (0.1231 g., (0.133 g., 0.585 millimole, 50%), and perfluoro-2,6-diaza-1,6-heptadiene (0.0322 g., 0.117 millimole, 10%), were isolated from the resulting reaction mixture by fractional distillation-condensation, followed by gas-liquid chromatography and were identified by their infrared spectra.

Higher molecular weight material was also obtained.

EXAMPLE 4

Perfluoro-2,3-diaza-1,3-butadiene (0.15 g., 1.17 millimoles), and perfluoropropene, $CF_3-CF=CF_2$ (0.174 g., 1.16 millimoles), were condensed under vacuum into a silica tube and then photolyzed together at room temperature for 24 hours, using a BH-6 lamp. Perfluoro-2,3-diaza1,3-butadiene (0.092 g., 0.0945 millimole, 10%), perfluoro-2,4-diaza-1,4-pentadiene (0.0207g., 0.117 millimole, 10%), perfluoro-2,4-diaza-3-trifluoromethyl - 1,4-pentadiene, $CF_2=N-CF(CF_3)-N=CF_2$ (0.018 g., 0.082 millimole, 7%), and perfluoro-2,5-diaza-3-trifluoromethyl-1,5-hexadiene, $CF_2=N-CF_2CF(CF_3)-N=CF_2$ (0.195 millimole, 60%), were isolated from the reaction mixture by fractional distillation-condensation, followed by gas-liquid chromatography, and identified by their molecular weight, infrared and mass spectra. The $F^{19}$ n.m.r. spectrum of perfluoro-2,5-diaza-3-trifluoromethyl-1,5-hexadiene showed three peaks in the ratio 3:2:1 together with a broad and complex peak corresponding to the terminal $CF_2=N-$ groups.

Higher molecular weight material was also obtained.

EXAMPLE 5

Perfluoro-2,3-diaza-1,3-butadiene (0.15 g., 1.17 millimoles), and perfluorobutene-2 (0.234 g., 1.17 millimoles), were condensed under vacuum into a silica tube and photolyzed together for 12 hours at room temperature, using a BH-6 lamp.

Perfluorobutene-2 (0.116 g., 0.58 millimole, 50%), perfluoro-2,4-diaza - 1,4 - pentadiene (0.025 g., 0.2 millimole, 17%), and perfluoro-2,5-diaza - 3,4 - bis(trifluoromethyl-1,5-hexadiene, $$CF_2=N-CF(CF_3)-CF(CF_3)N=CF_2$$

(0.15 g., 0.35 millimole, 30%), were isolated from the resulting mixture by fractional distillation-condensation and gas-liquid chromatography, and identified by their infrared spectra. The $F^{19}$ n.m.r. spectrum of perfluoro-2,5-diaza-3,4-bis(trifluoromethyl) - 1,5 - hexadiene shows the presence in this compound of three different types of fluorine atoms in the ratio of 3:2:1. Mass spectrum and molecular weight measurements also confirm the identity of the products.

EXAMPLE 6

Perfluoro-2,3-diaza-1,3-butadiene (0.234 g., 3.0 millimoles), and chlorotrifluoroethylene, $CF_2=CFCl$ (0.174 g., 1.5 millimoles), were condensed under vacuum into a silica tube and photolyzed together for four hours using a BH-6 lamp, at ca. 25° C.

From the resulting reaction mixture, perfluoro-2,3-diaza-1,3-butadiene (0.102 g., 1.32 millimoles, 44%), perfluoro-2,4-diaza-1,4-pentadiene (0.0427 g., 0.024 millimole, 8%), and perfluoro-2,5-diaza-3-chloro-1,5-hexadiene (0.117 g., 0.6 millimole, 20%), were isolated by fractional distillation-condensation and gas-liquid chromatography and characterized by their infrared, mass and $F^{19}$ n.m.r. spectra.

Higher molecular weight material was also obtained.

EXAMPLE 7

Perfluoro-2,3-diaza-1,3-butadiene (1 part) and tetrafluoroethylene (10 parts) were photolyzed together for 5 hours in a silica tube using a BH-6 lamp, at room temperature. A white solid was produced which was shown by its infrared spectrum to be $$CF_2=N-(CF_2)_n-N=CF_2$$

where the value of $n$ is about 20. This material was then hydrolyzed with 40 percent alcoholic potassium hydroxide solution, and the resultant solid acidified. The infrared spectrum of the hydrolyzed material indicated that it contained one or more carboxylic acid groups.

EXAMPLE 8

Following the procedure of Example 3, 2 parts of perfluoro-2,3-diaza-1,3-butadiene and 1 part of bromotrifluoroethylene are condensed into a silica tube, and then photolyzed together at room temperature for about 72 hours. The products of reaction isolated include pentafluoro-3-bromo-2,4-diaza-1,4-pentadiene, having the formula $CF_2=N-CFBr-N=CF_2$ and heptafluoro-3-bromo-2,5-diaza-1,5-hexadiene, having the formula $$CF_2=N-CF_2-CFBr-N=CF_2$$

What is claimed is:

1. A compound having the formula $$CF_2=N-(CFR)_n-N=CF_2$$

or $$CF_2=N-CF_2CFR'-N=CF_2$$

in which R is fluorine, chlorine, bromine or a lower perfluoroalkyl radical and $n$ is an integer from 1 to 20 when R is fluorine, and 1 or 2 when R is chlorine, bromine or lower perfluoroalkyl; and R' is chlorine, bromine or a lower perfluoroalkyl radical.

2. Perfluoro-2,4-diazapentadiene according to claim 1, having the formula $$CF_2=N-CF_2-N=CF_2$$

3. Perfluoro-2,5-diaza-1,5-hexadiene according to claim 1, having the formula $$CF_2=N-CF_2-CF_2-N=CF_2$$

4. Perfluoro-2,6-diaza-1,6-heptadiene according to claim 1, having the formula $$CF_2=N-CF_2CF_2CF_2-N=CF_2$$

5. Perfluoro-2,7-diaza-1,7-octadiene according to claim 1, having the formula $$CF_2=N-(CF_2)_4-N=CF_2$$

6. Perfluoro-2,4-diaza-3-trifluoromethyl-1,4-pentadiene according to claim 1, having the formula $$CF_2=N-CF(CF_3)-N=CF_2$$

7. Perfluoro-2,5-diaza-3-trifluoromethyl-1,5-hexadiene according to claim 1, having the formula $$CF_2=N-CF(CF_3)CF_2-N=CF_2$$

8. Perfluoro-2,5-diaza-3,4-bis(trifluoromethyl)-1,5-hexadiene according to claim 1, having the formula $$CF_2=NCF(CF_3)CF(CF_3)-N=CF_2$$

9. Perfluoro-2,5-diaza-3-chloro-1,5-hexadiene according to claim 1, having the formula $$CF_2=N-CFClCF_2-N=CF_2$$

References Cited

UNITED STATES PATENTS 2,966,517  12/1960  Hauptschein _____ 260—566

BERNARD HELFIN, Primary Examiner

G. A. SCHWARTZ, Assistant Examiner

U.S. Cl. X.R.

204—158; 260—465.7, 485

UNITED STATES PATENT OFFICE
CERTIFICATE OF CORRECTION

Patent No. 3,584,048          Dated June 8, 1971

Inventor(s) Paul H. Ogden

It is certified that error appears in the above-identified patent and that said Letters Patent are hereby corrected as shown below:

Column 3, line 20, "1800-1400 A." should read -- 1800-4000 A. --. Column 3, line 69, after "(0.1231 g." insert -- , 0.13 millimole, 11%), perfluoro-2,5-diazo-1,5-hexadiene --. Column 4, line 13, after "(0.195" insert -- g., 0.7 --.

Signed and sealed this 13th day of June 1972.

(SEAL)
Attest:

EDWARD M. FLETCHER, JR.
Attesting Officer

ROBERT GOTTSCHALK
Commissioner of Patents